UNITED STATES PATENT OFFICE.

HAROLD HIBBERT, OF PITTSBURGH, PENNSYLVANIA.

EXPLOSIVE COMPOSITION AND METHOD OF PRODUCING SAME.

1,231,351.  Specification of Letters Patent.  Patented June 26, 1917.

No Drawing.  Application filed April 17, 1916. Serial No. 91,687.

*To all whom it may concern:*

Be it known that I, HAROLD HIBBERT, a subject of the King of Great Britain, residing in Pittsburgh, Allegheny county, State of Pennsylvania, have invented certain new and useful Improvements in Explosive Compositions and Methods of Producing Same; and I do hereby declare the following to be a full, clear, and exact description of the invention, such as will enable others skilled in the art to which it appertains to make and use the same.

This invention relates to the production of explosive compositions containing nitrated carbohydrates such as sugar or starch, in admixture with, or in solution in, a nitrated 1.2-glycol or mixture of nitrated 1.2-glycols, or a mixture of such nitrated 1.2-glycol or nitrated 1.2-glycols with glycerin; and it also relates to methods of producing such explosive compositions by dissolving the carbohydrate in a glycol medium and then nitrating the resulting solution, whereby the nitration of the carbohydrate and of the 1.2-glycols is effected by a single operation.

The simpler carbohydrates, such as sugar, starch, dextrin, etc., are not capable of direct nitration, commercially as such as is cellulose, to produce commercial nitro-carbohydrate explosives. I have discovered, however, that the nitration of the simple carbohydrates can be effected in a smooth and advantageous manner by dissolving the carbohydrates in a 1.2-glycol medium, and by nitrating the resulting solution. The method of effecting this nitration, and the novel composition resulting therefrom, form the subject matter of the present invention.

The carbohydrates which are adapted for use, according to the present invention, are the simpler carbohydrates which are soluble in the 1.2-glycols. Among these simpler carbohydrates of particular importance are the sugars, including glucose, dextrose, cane sugar, and other monoses, dioses and polyoses, etc. Accordingly, I use the term "carbohydrate", in a generic sense, to include such simpler carbohydrates, which are soluble in the glycols, and which are capable of being nitrated in such solutions.

The individual 1.2-glycols, or the mixture of 1.2-glycols, or the mixture of 1.2-glycols and polyglycols, or of 1.2-glycols and glycerin, which are utilized for dissolving the carbohydrate, can be produced in various ways. For example, ethylene glycol can be produced from ethyl alcohol by first converting the alcohol into ethylene, chlorinating the ethylene, and heating the resulting chlorid with an aqueous solution of sodium carbonate. A mixture of ethylene, propylene and butylene glycols can be obtained from oil gas by subjecting the oil gas to a cracking process, chlorinating the resulting unsaturated hydrocarbons, and converting the chlorinated hydrocarbons into glycols by heating with an aqueous solution of sodium carbonate. These methods of producing the individual 1.2-glycol or mixture of 1.2-glycols are referred to as instances of how they may be prepared on a commercial scale. I do not, however, in the present instance, limit myself to any particular method of preparing these glycols, since obviously many different methods are available, and the particular method employed forms no part of the present invention.

When the individual 1.2-glycols, or mixture of 1.2-glycols, are heated to relatively high temperatures, for considerable periods of time, or are treated with a suitable condensing agent, or catalytic agent, they combine, with elimination of water, to form the diglycols, triglycols, etc., which are herein referred to, generically, as polyglycols. Where a single 1.2-glycol is condensed the resulting polyglycol will, of course, be formed from two or more molecules of this glycol by the elimination of water. Where a mixture of 1.2-glycols is condensed, the resulting polyglycol mixture may be made up of the polyglycols from the individual glycols, or of condensation products of different glycols with each other. Usually, only a part of the glycol or glycols will be condensed to polyglycols, and the resulting product will accordingly be made up of a mixture of 1.2-glycols with polyglycols, in which mixture the polyglycols may be present to the extent of only a few per cent., or of a much larger per cent. Where the individual polyglycols are desired, they may be isolated from admixture with the glycols and other polyglycols, or they may be produced by other suitable means.

The particular method of producing the 1.2-glycols and the polyglycols forms no part of the present invention, and accordingly any suitable method may be utilized for their production.

The polyglycols, as well as the 1.2-glycols, can be used for dissolving the carbohydrates, with important advantages due to the increased viscosity of the resulting product. On the other hand, there are important advantages in the utilization of a mixture of 1.2-glycols with polyglycols, such as are obtained by condensing the individual 1.2-glycols or mixture of 1.2-glycols, as the carbohydrate solvent.

The amount of carbohydrate which can be dissolved in the glycol medium and nitrated therewith can be varied within rather wide limits, depending upon the particular 1.2-glycol or mixture of glycols utilized as a solvent, the viscosity or other properties of the resulting explosive, and other considerations. It will be understood that where relatively larger amounts of the higher 1.2-glycols and polyglycols are present, the solvent will be of a somewhat more viscous nature, and the resulting nitrated product will be correspondingly modified. For some purposes it may be more advantageous to dissolve only small amounts, say a few per cent., of the carbohydrates, in the glycol medium, and thereby produce an explosive composition containing only small amounts of the nitro-carbohydrate. For other purposes, an explosive of more important charteristics may be produced by dissolving larger proportions of the carbohydrate in the glycol medium.

The solution of the carbohydrate in the glycol medium is nitrated by the action of a mixture of concentrated sulfuric and nitric acids, such as are used for the manufacture of nitroglycerin, and there is produced as a result of the nitration a mixture of the nitro-carbohydrate with, or a solution of the nitro-carbohydrate in, the nitrated 1.2-glycol or mixture of nitrated 1.2-glycols, or mixture of nitrated 1.2-glycols and nitrated 1.2-polyglycols.

The product of nitration is of materially reduced volatility, because of the added viscosity of the nitro-carbohydrate constituent, as compared with the volatility of the nitrated 1.2-glycols themselves.

The following specific example further illustrates the invention:

Forty parts of cane sugar are dissolved in about sixty parts of the mixture of ethylene, propylene and butylene glycols referred to above, and obtainable, for example, from oil gas according to the process of my application Serial No. 55,934, filed October 15, 1915. The solution is promoted by warming to about 80° to 100° C., and the mixture is then allowed to cool to room temperature. This is then dropped slowly into about 800 parts of a mixture containing equal parts by weight of 95 per cent. nitric acid and fuming sulfuric acid containing 6 to 10 per cent. $SO_3$. Prior to this addition, the nitrating acid is cooled to about 5° C. The nitration is carried out at around 15° C., the acid mixture being stirred vigorously during the slow addition of the glycol mixture. After the addition has been completed, the mixture is stirred for some time, say about thirty minutes, during which time the temperature falls to about 5° C. The nitrated product separates out readily and is purified by washing with water and dilute sodium carbonate solution. About 210 parts of the product are obtained in the form of a pale yellow oil.

The explosive composition resulting from the nitration of the solution of carbohydrate in the glycol medium, is a stable product having the advantage of low volatilization and of low freezing point. It has the further advantage that its viscosity can be varied by varying either the amount of carbohydrate dissolved or the amounts of polyglycols and of glycols present. The property can also be varied by using different carbohydrates.

For some purposes it may be advantageous to incorporate nitroglycerin with the explosive compositions. For this purpose the glycerin may, with advantage, be mixed with the glycols and form a part of the solvent, so that it will be nitrated simultaneously with the other constituents. Inasmuch as the nitration process of the 1.2-glycols has proven to be similar to, or substantially the same as, that of nitrating glycerin, the nitration process proceeds smoothly to give the desired nitrated mixtures.

The explosive compositions of the present invention can of course be compounded with other explosive ingredients or constituents, including the inorganic oxidizing agents where these are of importance in the explosive composition. Accordingly, I refer to the nitrated 1.2-glycol and nitro-carbohydrate composition, generically, as including not only the nitrated 1.2-glycols and their mixtures with each other and with nitrated polyglycols, but also their mixture with nitro-glycerin and other explosive constituents with which they may be combined in the production of commercial explosives.

I claim:—

1. The method of nitrating carbohydrates soluble in 1.2-glycols and of producing explosive compositions containing nitrated carbohydrates, which comprises dissolving the carbohydrates in a 1.2-glycol medium and nitrating the resulting solution, and thereby producing a mixture of nitrated 1.2-carbohydrate with nitrated 1.2-glycol or nitroglycols; substantially as described.

2. The method of nitrating carbohydrates soluble in 1.2-glycols and of producing explosive compositions containing nitrated carbohydrates, which comprises dissolving the carbohydrate in a mixture of 1.2-glycols and nitrating the resulting solution and thereby producing a mixture of nitrated 1.2-carbohydrate with nitroglycols; substantially as described.

3. The method of nitrating carbohydrates soluble in 1.2-glycols and of producing explosive compositions containing nitrated carbohydrates, which comprises dissolving the carbohydrate in a mixture of 1.2-glycols and polyglycols and nitrating the resulting solution and thereby producing a mixture of nitro-carbohydrates with nitrated 1.2-glycols and nitrated polyglycols; substantially as described.

4. The method of nitrating carbohydrates soluble in 1.2-glycols and of producing explosive compositions containing nitrated carbohydrates, which comprises dissolving the carbohydrate in a mixture of 1.2-glycols containing ethylene, propylene and butylene glycols, and nitrating the resulting solution and thereby producing a mixture of nitro-carbohydrate with nitrated 1.2-glycols; substantially as described.

5. The method of nitrating carbohydrates soluble in 1.2-glycols and of producing explosive compositions containing nitrated carbohydrates, which comprises dissolving the carbohydrate in a mixture of 1.2-glycols containing ethylene, propylene and butylene glycols together with polyglycols, and nitrating the resulting solution and thereby producing a mixture of nitro-carbohydrate with nitrated 1.2-glycols and nitrated polyglycols; substantialy as described.

6. The method of nitrating carbohydrates soluble in 1.2-glycols and of producing explosive compositions containing nitrated carbohydrates, which comprises dissolving the carbohydrate in a 1.2-glycol solution containing glycerin, and nitrating the resulting solution and thereby producing a mixture of nitro-carbohydrate with nitrated 1.2-glycol, or nitrated 1.2-glycols, and nitro-glycerin; substantially as described.

7. The method of nitrating carbohydrates soluble in 1.2-glycols and of producing explosive compositions containing nitrated carbohydrates, which comprises dissolving the carbohydrate in a mixture of 1.2-glycols containing ethylene, propylene and butylene glycols together with glycerin, and nitrating the resulting solution and thereby producing a mixture of nitro-carbohydrate with nitrated 1.2-glycols, and nitro-glycerin; substantially as described.

8. The method of nitrating carbohydrates soluble in 1.2-glycols and of producing explosive compositions containing nitrated carbohydrates, which comprises dissolving the carbohydrate in a mixture of 1.2-glycols containing ethylene, propylene and butylene glycols together with polyglycols and glycerin, and nitrating the resulting solution and thereby producing a mixture of nitro-carbohydrate with nitrated 1.2-glycols, nitrated polyglycols and nitro-glycerin; substantially as described.

9. An explosive composition, comprising a mixture of nitro-carbohydrate with a nitrated 1.2-glycol; substantially as described.

10. An explosive composition, comprising a mixture of nitro-carbohydrate with a nitrated mixture of 1.2-glycols; substantially as described.

11. An explosive composition, comprising a mixture of nitro-carbohydrate with mixtures of nitrated 1.2-glycols and nitrated polyglycols; substantially as described.

12. An explosive composition, comprising a mixture of nitro-carbohydrate with a nitrated mixture of nitrated 1.2-glycols containing ethylene, propylene and butylene glycols; substantially as described.

13. An explosive composition, comprising a mixture of nitro-carbohydrate with a nitrated mixture of nitrated 1.2-glycols containing ethylene, propylene and butylene glycols, together with nitrated polyglycols; substantially as described.

14. An explosive composition, comprising a mixture of nitro-carbohydrate with a nitrated 1.2-glycol and nitro-glycerin; substantially as described.

15. An explosive composition, comprising a mixture of nitro-carbohydrate with a mixture of nitrated 1.2-glycols and nitro-glycerin; substantially as described.

16. An explosive composition, comprising a mixture of nitro-carbohydrate with a mixture of nitrated 1.2-glycols, nitrated polyglycols, and nitro-glycerin; substantially as described.

17. An explosive composition, comprising a mixture of nitro-carbohydrate with a mixture of nitrated 1.2-glycols containing nitrated ethylene, propylene and butylene glycols and nitro-glycerin; substantially as described.

18. An explosive composition, comprising a mixture of nitro-carbohydrate with a mixture of nitrated 1.2-glycols containing nitrated ethylene, propylene and butylene glycols, nitrated polyglycols and nitro-glycerin; substantially as described.

In testimony whereof I affix my signature.

HAROLD HIBBERT.